United States Patent [19]

Peroff

[11] Patent Number: 4,571,879
[45] Date of Patent: Feb. 25, 1986

[54] SINKER FOR A FISHING LINE

[76] Inventor: George A. Peroff, 16 Regent St., Port Macquarie, 2444, New South Wales, Australia

[21] Appl. No.: 633,031

[22] Filed: Jul. 18, 1984

[51] Int. Cl.⁴ .............................................. A01K 95/00
[52] U.S. Cl. .................................................... 43/44.97
[58] Field of Search ............................. 43/44.96, 44.97

[56] References Cited

U.S. PATENT DOCUMENTS

| 2,109,693 | 3/1938 | Gaines | 43/44.97 |
| 2,601,737 | 7/1952 | Neja | 43/44.96 |
| 2,611,988 | 9/1952 | Gibson | 43/44.96 |
| 2,623,323 | 12/1952 | Knott | 43/44.96 |
| 2,945,324 | 7/1960 | Miller | 43/44.97 |
| 4,019,275 | 4/1977 | Ruppe | 43/44.96 |
| 4,058,927 | 11/1977 | Hershey | 43/44.97 |

Primary Examiner—Gene P. Crosby
Attorney, Agent, or Firm—Emory L. Groff, Jr.

[57] ABSTRACT

A sinker for attachment to a fishing line, the sinker comprises a pentahedral body of isosceles triangular section which tapers from end to end of the body. The ends are in parallel planes at right angles to the apex edge of the body. A longitudinal line attachment rail parallel to the apex edge projects centrally above the base face of the body which is opposite the apex edge. An arm extends from the smaller end of the body and lies parallel to the rail.

6 Claims, 13 Drawing Figures

SINKER FOR A FISHING LINE

This invention relates to weights used in fishing to maintain the hook of a fishing line below the water surface. Such weights are commonly called sinkers.

Sinkers have been used for many years and have been made in many forms to suit various use conditions. When the fisherman uses a weighted line in proximity to coastal rocky shorelines and over reefs there is always the possibility that the sinker will become snagged in the rocks making its retrieval impossible. This invention has been devised to substantially overcome this problem.

Broadly, the invention comprises a sinker which has an elongated pentahedral body which tapers uniformly in the length direction with an isosceles triangular bottom which is larger than a similar isosceles triangular top, the bottom and top are in parallel planes at right angles to the apex edge of the body which is the edge joining the apex of the triangles forming the bottom and top of the body, a rail parallel to the apex edge of the body and located longitudinally centrally above the base surface of the body which is the surface having the bases of the triangles forming the bottom and top of the body as its ends, and an arm extending from the top of the body in a direction parallel to the rail.

A specific embodiment of the invention will now be described with reference to the accompanying drawings in which.

Figure 6:
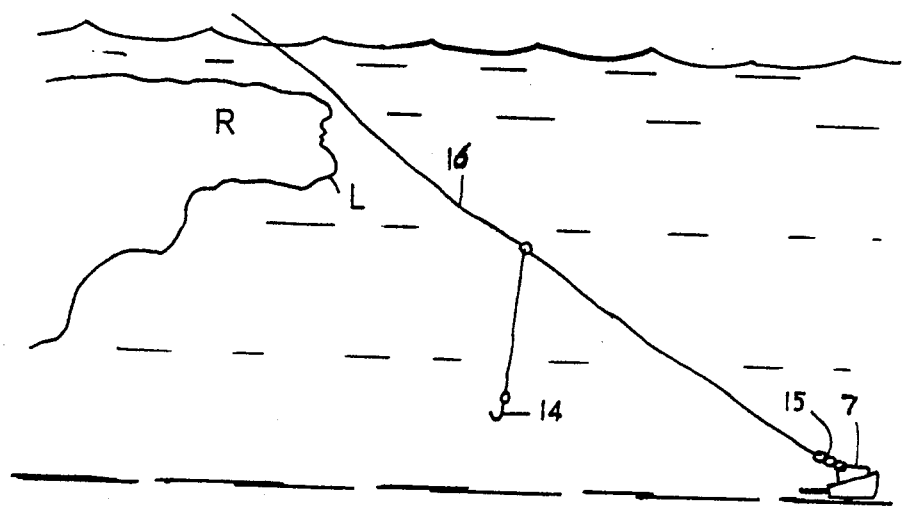
Figure 7:
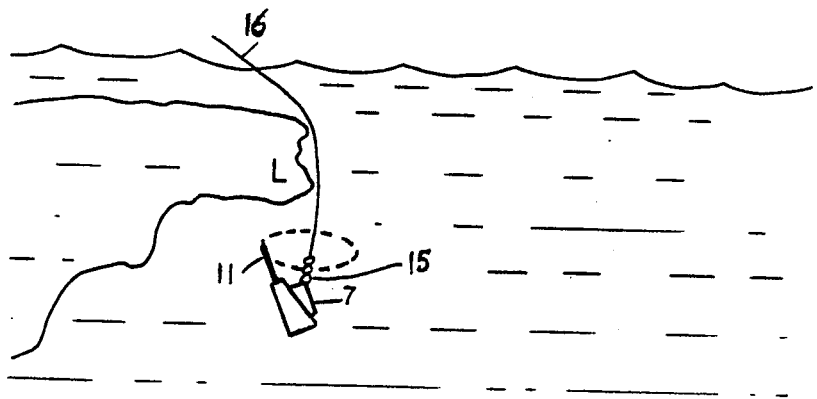
Figure 8:
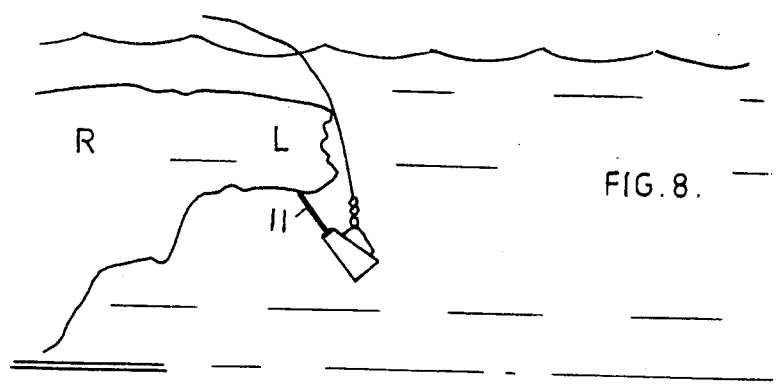
Figure 9:
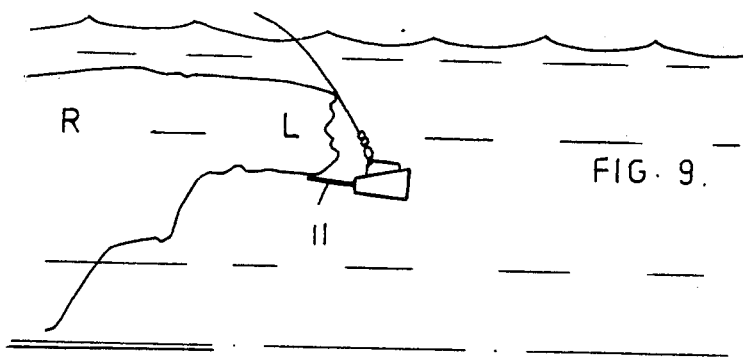
Figure 10:
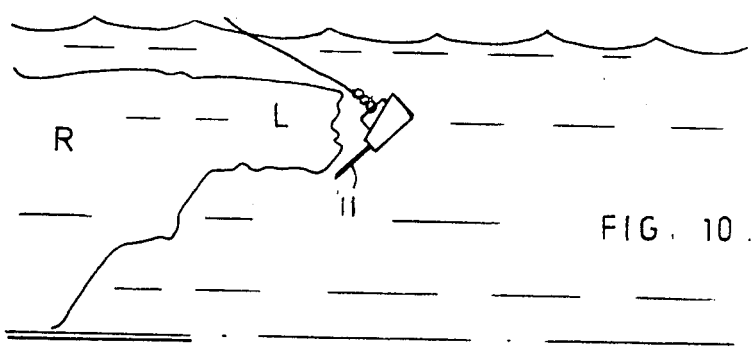
Figure 11:
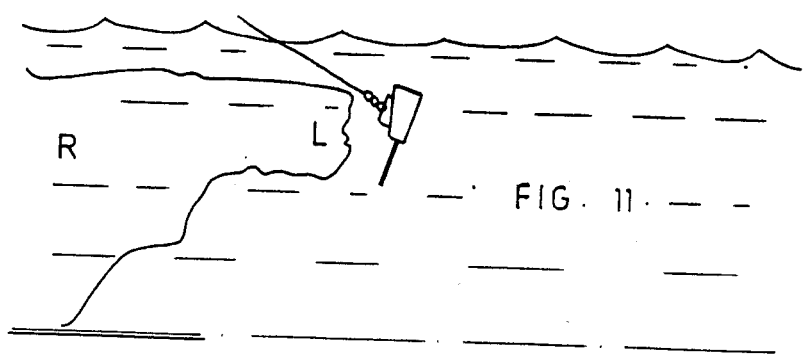
Figure 12:
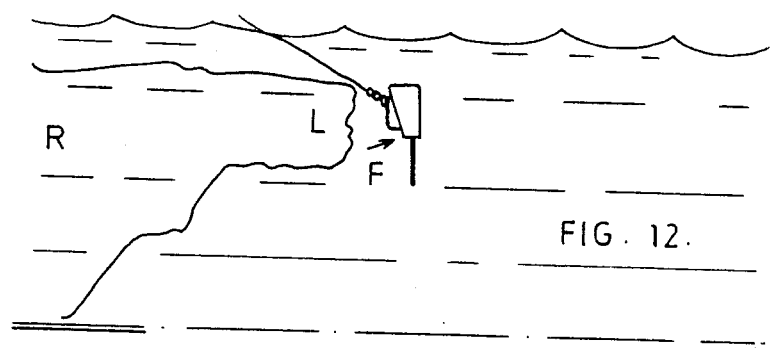
Figure 13:
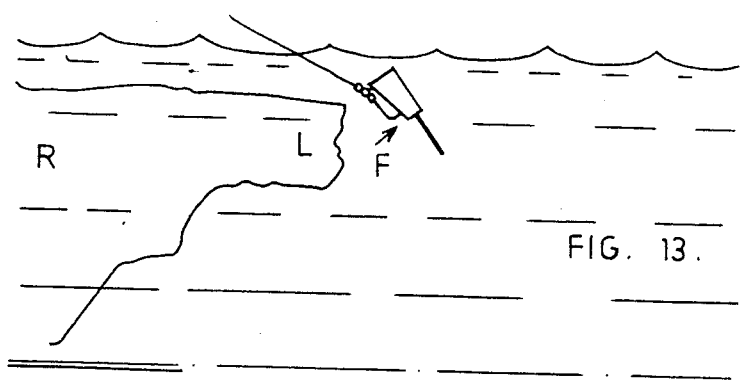

FIG. 6 illustrates a fishing line arrangement where the fishing is being conducted adjacent a submerged rock formation, FIG. 7 shows a first stage of sinker retrieval, FIG. 8 shows a second stage of sinker retrieval, FIG. 9 shows a third stage of sinker retrieval, FIG. 10 shows a fourth stage of sinker retrieval, FIG. 11 shows a fifth stage of sinker retrieval, FIG. 12 shows a sixth stage of sinker retrieval, and FIG. 13 shows the final stage of sinker retrieval.

The sinker is a pentahedral body of triangular section, the triangle is of isosceles shape. The body has a base surface 1 and two adjacent like sized surfaces 2 and 3. The body has two ends 4 and 5 each of which is an isosceles triangle in shape with one end 4 being larger than the other end 5. The ends 4 and 5 are parallel and lie in planes which are at right angles to the plane occupied by the base edge 6 of the body. The body tapers uniformly from end to end.

There is a rail 7 located laterally centrally above the base surface 1 of the body with legs 8 and 9 which enter the base surface 1. The rail 7 is parallel to the apex edge 6 of the body.

Figure 1:
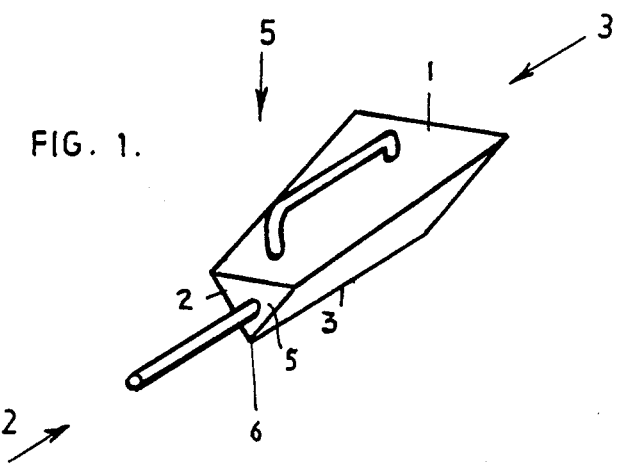
FIG. 1 is a perspective view of the sinker of the invention.
Figure 2:
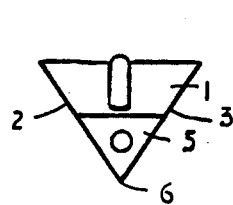
FIG. 2 is a an end view in the direction of the arrow 2 of FIG. 1.
Figure 3:
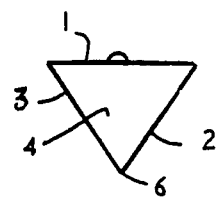
FIG. 3 is an end view in the direction of the arrow 3 of FIG. 1.
Figure 4:
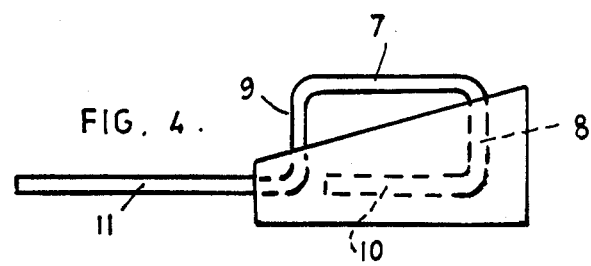
FIG. 4 is a side view of the sinker.
Figure 5:
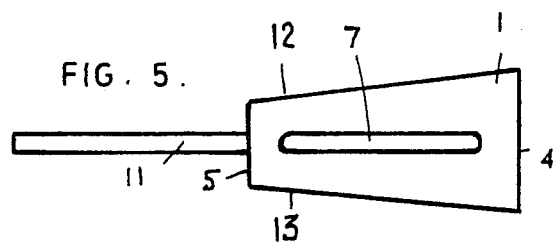
FIG. 5 is a plan view of the sinker in the direction of the arrow 5 of FIG. 1.

From FIG. 4 it will be seen that the legs 8 and 9 (as shown in dotted outline) have specific shapes after they enter the body. The leg 8 passes into the body and has a tail part 10 which is aligned with the extension 11 of the leg 9. The tail part 10 can be located at the apex edge 6 to provide a wear strip along the edge 6, if this is desired. The extension 11 projects substantially centrally from the end 5 of the body and lies parallel to the rail 7. The rail 7 and its extensions 8 to 11 are preferably made from a non-corroding hard metal, such as stainless steel rod. The tail part 10 need not be part of the rail leg 8.

The body shape has been developed after extensive experimentation and the angular relationships of its various faces are preferably as follows. The included angle between the apex edge 6 and the base surface 1 of the body is preferably 15 degrees but may lie in the range of 10 to 20 degrees. There is a preferred included angle of 20 degrees between the long sides 12 and 13 of the base surface 1 although this angle may be between 17 and 25 degrees. The ends 4 and 5 of the body are isosceles triangles with base angles of preferably 52.5 degrees and an apex angle of 75 degrees. These angles may vary with the apex angle in the range 65 to 85 degrees and the base angles correspondingly sized in the range 47.5 to 57.5 degrees. The base angle can be determined as half the difference between 180 degrees and the selected apex angle.

An average sized sinker, made of lead and weighing grams., and having the preferred features specified above would have a body length, end to end, of 35 mm, a maximum base surface width of 20 mm. The extension 11 would terminate 34 mm from the end 5 of the body, the diameter of the rail member and its extensions would be 2 mm, the length of the rail portion would be 25 mm with the legs 8 and 9 spaced by equal distances from the ends 4 and 5 of the body.

The operation of the sinker will now be described with reference to the drawing FIGS. 6 to 13 in which FIGS. 8 to 13 show stages in a continuous process whereby a snagged sinker is extricated from a situation where a normal sinker would almost certainly have to be sacrificed and lost in order to reel in the fishing line. In FIG. 6 the sinker is shown on the seabed adjacent a rock formation R, as could be encountered when fishing over a reef or from coastal rocky headlands and the like. The sinker is connected by a swivel 15 on the rail 7 to a fishing line 16 with a hook 14 attached to the line 16 at a distance from the sinker so the hook and the bait thereon can be moved about by the water in a manner likely to attract fish. When the fisherman retrieves his line it is possible for the sinker to foul on projecting surfaces of the rocks R, as indicated by the ledge L in FIGS. 7 to 13.

FIG. 7 indicated by the dotted elipse a possible path for the terminal end of the extension 11 as the sinker rotates relative to the fishing line 16 due to water movement. It will be seen that the swivel 15, which permits the rotating action to occur unhindered, is vertically aligned with the fishing line 16 running over the edge of the ledge L, and that the swivel 15 is located in the bend between the rail 7 and the leg 9. This orientation is due to the shaping and weight distribution of the sinker. The centre of mass for the sinker when supported as shown in FIG. 7 causes the swivel to adopt the position shown and the extension 11 to be angled as shown.

Assuming that an attempt has been made to reel in the fishing line and the sinker has failed to pass over the ledge L. By lowering the line slightly until the sinker is clear of the ledge the sinker will be free to rotate due to water turbulance. Assume the sinker has achieved the FIG. 7 orientation. As the line is again reeled in the extension 11 will engage on the underface of the ledge L and the application of further force will cause the sinker to pivot about the contact point between the extension 11 and the ledge to achieve the sinker orientation shown in FIG. 8 and then FIG. 9.

Until now the swivel 15 has been located in the bend between the rail 7 and the leg 9. As the sinker adopts the more upright position shown in FIG. 10 the swivel connection to the rail 7 will, with the continued application of force on the fishing line 16, tend to move from the position adjacent the leg 9 along the rail towards the leg 8. FIGS. 10 to 12 show further stages in the "roll over" of the sinker to a condition free of the ledge L whereupon the line 16 can be freely reeled in to lift the sinker clear of the rocks R.

It is to be noted that forward movement of the broad base surface 1 of the sinker in the direction in which the line is being reeled in (during the stages shown in FIGS. 10 to 13) will be opposed by the water and this promotes an uplifting and rotating force on the sinker. This is particularly so in the latter stages of recovery, FIGS. 12 and 13, where there is a lever arm effect with the force F acting over the broad surface 1 and the sinker able to pivot about the connection of the swivel 15 to the sinker at the bend where the rail 7 and the 8 meet, adjacent the end 4 of the sinker.

I claim:

1. A sinker which has an elongated pentahedral body which tapers uniformly in the length direction with an isosceles triangular bottom which is larger than a similar isosceles triangular top, the bottom and top are in parallel planes at right angles to the apex edge of the body which is the edge joining the apex of the triangles forming the bottom and top of the body, a rail parallel to the apex edge of the body and located longitudinally centrally above the base surface of the body which is the surface having the bases of the triangles forming the bottom and top of the body as its ends, and an arm extending from the top of the body in a direction parallel to the rail.

2. A sinker as claimed in claim 1 wherein the rail is connected to the body by two legs, one of said legs lies adjacent the bottom of said body and terminates with a portion which extends parallel said apex edge.

3. A sinker as claimed in claim 2 wherein the other of said legs lies adjacent the top of said body and extends into said body and then exits from said body through the top of said body to provide said arm.

4. A sinker as claimed in claim 1 wherein the angle between the apex edge of the body and the base surface of the body is between 10 and 20 degrees, the base surface has two sides the same length, the said two sides having an angle of between 17 and 25 degrees, the bottom and top of the body are similar isosceles triangles in shape with the apex angle thereof between 65 and 85 degrees and the base angles thereof equal and half the difference between 180 and the selected apex angle.

5. A sinker as claimed in claim 1 wherein the angle between the apex edge of the body and the base surface of the body is 15 degrees, the base surface has two sides the same length, the said two sides having an angle of 20 degrees, the bottom and top of the body are similar isosceles triangles in shape with the apex angle thereof 75 degrees and the base angles thereof each equal to 52.5 degrees.

6. A sinker as claimed in claim 5 wherein said arm extends beyond said body for 34 mm, said body is 35 mm from bottom to top and the maximum width of said base surface is 20 mm.

* * * * *